United States Patent [19]

Tokumaru et al.

[11] Patent Number: 4,812,008
[45] Date of Patent: Mar. 14, 1989

[54] METHOD AND APPARATUS FOR CONNECTING OPTICAL FIBERS

[75] Inventors: Yuzo Tokumaru; Osamu Nishi, both of Kanagawa, Japan

[73] Assignee: Sumitomo Electric Industries, Ltd., Osaka, Japan

[21] Appl. No.: 73,822

[22] Filed: Jul. 15, 1987

[30] Foreign Application Priority Data

Jul. 21, 1986 [JP] Japan .................... 61-172294

[51] Int. Cl.⁴ .................................. G02B 6/40
[52] U.S. Cl. .................... 350/96.21; 350/96.20
[58] Field of Search ............ 350/96.20, 96.21, 96.22

[56] References Cited

U.S. PATENT DOCUMENTS

| 3,948,582 | 4/1976 | Martin | 350/96.21 |
| 3,976,355 | 8/1976 | Matthews | 350/96.21 |
| 4,015,894 | 4/1977 | Rocton | 350/96.21 |
| 4,105,285 | 8/1978 | Bedgood et al. | 350/96.21 |
| 4,166,672 | 9/1979 | Gilbert | 350/96.21 |

Primary Examiner—William L. Sikes
Assistant Examiner—Akm E. Ullah
Attorney, Agent, or Firm—Cushman, Darby & Cushman

[57] ABSTRACT

A method and apparatus for connecting optical fibers using a grooved steel wire to position a pair of guide sleeves and a fitting sleeve into which a pair of optical fibers may be inserted so that end portions thereof bear against each other. A thermal melting adhesive sleeve and a thermal shrinking tube are provided to cover the steel wire, the guide sleeves and the fitting sleeve so that when the thermal melting adhesive sleeve and the thermal shrinking tube are heated, the thermal shrinking tube is shrunk while the adhesive sleeve is melted to integrate the steel wire, the fitting sleeve, the guide sleeves and the optical fibers with each other.

6 Claims, 2 Drawing Sheets

METHOD AND APPARATUS FOR CONNECTING
OPTICAL FIBERS

BACKGROUND OF THE INVENTION

1. Field of the Invention

The present invention relates to a method and apparatus for permanently connecting optical fibers. More particularly, the present invention relates to a method and apparatus for connecting optical fibers without employing fusion welding.

2. Description of the Prior Art

An example of a prior art optical fiber connector that does not employ fusion welding is disclosed in Japanese Utility Model Unexamined Publication No. 60-119514/1985. A connector of this type is illustrated in FIGS. 6a and 6b. FIG. 6a illustrates an adaptor for the connector and FIG. 6b illustrates a plug housing. As shown in those figures, the prior art connector consists of an optical connector ferrule 12 for positioning the center of an optical fiber core 11, a housing 13 for accommodating the optical connector ferrule 12, a coupler 14 for fastening the optical connector ferrule 12 to a housing 13, and an adaptor 15 into which the optical connector ferrule 12 may be inserted to center the optical fiber prior to coupling.

However, prior art optical fiber connectors such as those illustrated in FIGS. 6a and 6b have a number of disadvantages. For example, their multipart construction makes them very expensive to produce. In addition, their use is difficult and requires a long time, about an hour, because an end surface polishing jig must be used before the connection can be made. Moreover, the connections made by such a device are relatively low in quality, resulting in an average loss in single mode fibers of about 1 decibel. Furthermore, there is a great variation in the quality of connections made by such devices, resulting from such external factors as vibrations, bending, tension, and other factors.

SUMMARY OF THE INVENTION

It is an object of the present invention to provide a method and apparatus for connecting optical fibers that does not have the disadvantages of the prior art connector discussed above.

According to a preferred embodiment of the present invention, the connection member for connecting optical fibers comprises a steel wire formed with a longitudinally extending groove; a fitting sleeve attached in the groove of the wire, the fitting sleeve having an inner bore formed therein and a slot formed at its longitudinal central portion, the inner bore having a diameter that is matched for a diameter of a bare optical fiber; a pair of guide sleeves that are positioned in the groove of the wire and are at opposite sides of the fitting sleeve, each of the guide sleeves having an inner diameter matched to receive the diameter of a coated optical fiber; a thermal melting adhesive sleeve covering the grooved wire; and a thermal shrinking tube disposed at the outside of the thermal melting adhesive sleeve.

According to the method of connecting optical fibers of the present invention, a grooved steel wire is prepared having a fitting sleeve attached thereon and a pair of guide sleeves attached to the grooved steel wire at opposite sides of the fitting sleeve, the fitting sleeve having a slot formed at its longitudinal central portion and having an inner bore with a diameter that is matched for a diameter of the bare optical fiber, each of the guide sleeves having an inner diameter matched for a diameter of the coated optical fiber; inserting a pair of coated optical fibers into the guide sleeves so that respective end surfaces thereof abut each other at the center of the fitting sleeve; pouring an adhesive into the fitting sleeve through the slot so as to fix the end surfaces to each other; covering the coated optical fibers with a thermal melting adhesive sleeve in a thermal shrinking tube; and heating the thermal melting adhesive sleeve and the thermal shrinking tubes from the outside so that the thermal shrinking tube shrinks at the same time the adhesive sleeve melts to thereby integrate the steel wire, the fitting sleeve, the guide sleeves and the optical fibers into a single unit.

Other objects, features, and characteristics of the present invention, as well as the methods and operation and functions of the related elements of the structure, and to the combination of parts and economies of the manufacturer, will become apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENT

Figure 1:
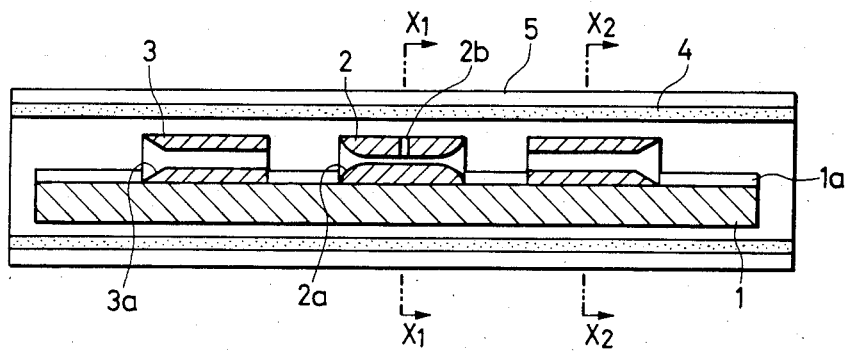
FIG. 1 is a longitudinal section of a connecting member according to a preferred embodiment of the present invention.
Figure 2A:
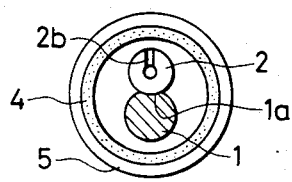
FIG. 2(a) is a cross section taken along line $X_1-X_1$ in FIG. 1.
Figure 2B:
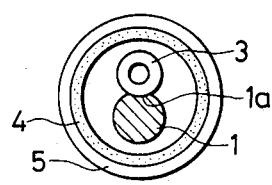
FIG. 2(b) is a cross section taken along line $X_2-X_2$ in FIG. 1.

Referring to FIG. 1, the reference numeral 1 designates a steel wire having in its longitudinal direction a groove 1a into which a fitting sleeve 2 and a pair of guide sleeves 3 are positioned. The fitting sleeve 2 is made of glass and has an inner bore having a diameter matched for the diameter of a bare optical fiber B (see FIG. 3), and has tapered portions 2a formed at its opposite end portions. The fitting sleeve 2 further is provided with a radial bore 2b in its center for applying adhesives to the bore. Each of the guide sleeves 3 has an inner diameter that is formed to receive a coated optical fiber A (see FIG. 3(b)) and a tapered portion 3a formed at its one end portion. The fitting sleeve 2 and the guide sleeves 3 are fixed in the groove 1a by an adhesive so that the fitting sleeve and the guide sleeves are fixed to the steel wire 1.

A thermal melting adhesive sleeve 4 is provided to surround the steel wire 1, the fitting sleeve 2 and the guide sleeves 3, as is shown in FIG. 1. As also shown in FIG. 1, a thermal shrinking tube 5 is provided around the thermal melting adhesive sleeve 4. The thermal melting adhesive sleeve 4 and the thermal shrinking tube 5 may be provided as two separate layers, or the former may be provided integrally on the inner circumferential surface of the latter.

In connecting optical fibers, the thermal melting adhesive sleeve 4 in the thermal shrinking tube 5 are inserted in advance onto one of the coated optical fibers A to be connected. Next, the steel wire 1 on which the fitting sleeve 2 and the guide sleeves 3 have been fixed is set under a microscope (not shown), and under observation through the microscope, one of the coated optical fibers A has its coatings removed to expose the end portions of the respective bare optical fibers B. One of the respective bare optical fibers B is then inserted into one of the guide sleeves 3 and is pushed so that the end surface thereof advances to the center of the fitting sleeve 2. Next, the other optical fiber is inserted into the other guide sleeve 3 and pushed so as to make its end surface abut the end surface of the first optical fiber. Then, an adhesive 6 having a rapid curing property and a refractive index the same as the optical fiber is poured through the bore 2a formed in the central portion of fitting sleeve 2 and cured to fix the end surfaces of the two optical fibers to one another.

Figure 3:
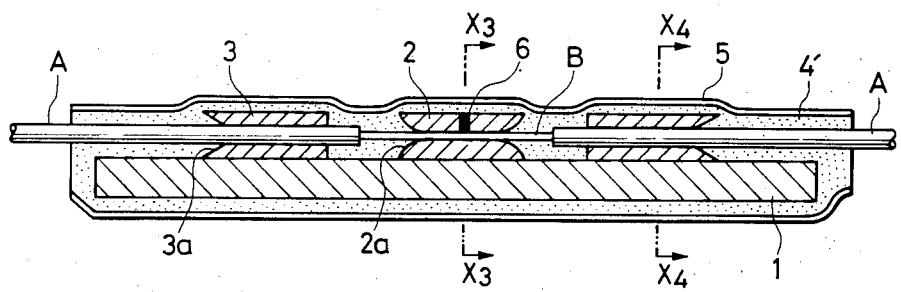
FIG. 3 is a longitudinal section of an optical fiber connection formed according to the method of the present invention.
Figure 4A:
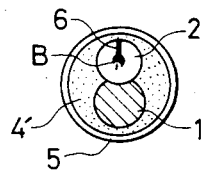
FIG. 4(a) is a cross section taken along line $X_3-X_3$ in FIG. 3.
Figure 4B:
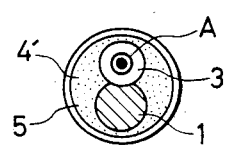
FIG. 4(b) is a cross section taken along line $X_4-X_4$ in FIG. 3.
Figure 5A:
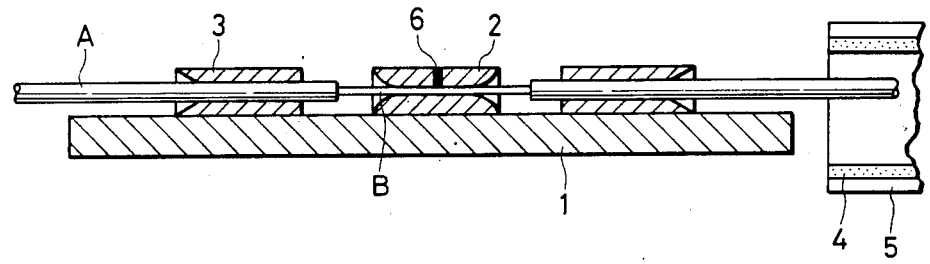
FIGS. 5(a) and 5(b) are longitudinal sections showing the process of the production method according to the present invention.
Figure 5B:
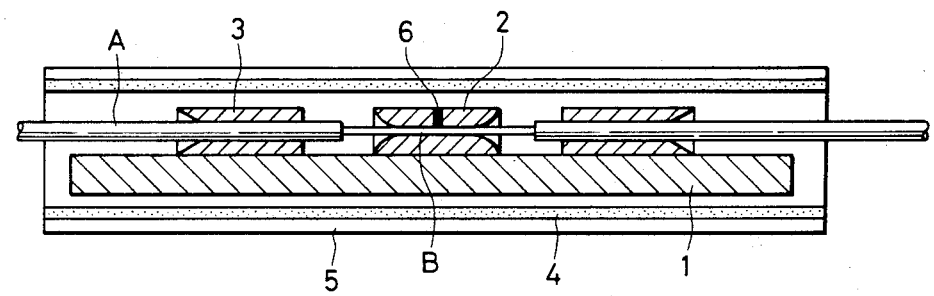
Figure 6A:
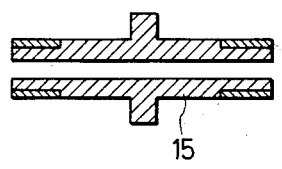
FIGS. 6(a) and 6(b) are longitudinal sections of a prior art optical fiber connector.
Figure 6B:
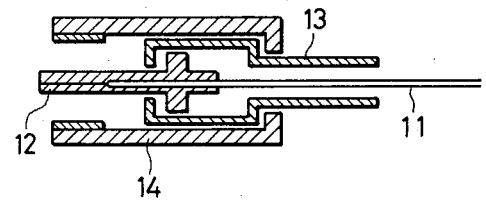

Thereafter, the thermal melting adhesive sleeve 4 and the thermal shrinking tube 5 are placed over the steel wire 1 as shown in FIG. 5(b) and mounted on a heater having a structure for heating the thermal shrinking tube 5 from its center to its opposite ends. In this way, the thermal shrinking tube 5 is shrunk by heating it while adhesive sleeve 4 is melted, thereby integrating the steel wire 1, the fitting sleeve 2, the guide sleeves 3, and the optical fibers into a single integral assembly, as shown in FIG. 3.

In a model of an apparatus constructed according to the present invention, the sizes of the components used were as follows:

| Item | Inner Diameter | Outer Diameter | Length |
| --- | --- | --- | --- |
| Fitting sleeve | 126 um | 1 mm | 10–20 mm |
| Guide sleeve | 250–300 um | 1 mm | 10–20 mm |
| Copper wire | — | 1.5–2 mm | 50–60 mm |
| Thermal melting adhesive sleeve | 2.5 mm | 2.9 mm | 50–60 mm |
| Thermal shrinking tube | 3.0 mm | 3.4 mm | 50–60 mm |

Many advantages are realized by the present invention as constructed above, some of which are:

1. A sharp cut in manufacturing costs is realized because of the simplified structure of the present invention and its relatively few parts.

2. Manufacturing time is shortened because the hours taken for assembling parts are reduced, and the step of polishing the end surfaces of optical fibers is made unnecessary.

3. Connection of optical fibers can more easily be performed on site because only such simple tools as a fiber cutter and a microscope are necessary.

4. Because the bare optical fibers abut each other in a fitting sleeve having an inner diameter matched for a diameter of the respective buffer optical fiber, no inter-axes discrepancy accrues with its attendant connection loss. By using the present invention, the result of an experiment (n=50) carried out by using single mode fibers showed that the mean connection loss was 0.1 decibels.

5. Variations in light loss remain small (0.01 decibels or less), even if external forces such as bending, tension, and vibrations were applied to the outer portions of the assembly, because the connected end surfaces of the buffer optical fibers were fixed by an adhesive and the optical fibers are integrated firmly with the steel wire by a thermal melting adhesive.

While the invention has been described in connection with what is presently considered to be the most practical and preferred embodiment, it is to be understood that the invention is not limited to the disclosed embodiment, but, on the contrary, is intended to cover various modifications and equivalent arrangements included within the sphere and scope of the appended claims.

What the claim is:

1. A connection member for connecting optical fibers comprising:
    a wire member having a longitudinally extending groove defined in an outer surface thereof;
    a fitting sleeve attached to said wire member in said groove, said fitting sleeve having a longitudinal inner bore for receiving a bare optical fiber;
    a pair of guide sleeves attached to said wire member in said groove on each side of said fitting sleeve, each of said guide sleeves having a longitudinal bore for receiving a coated optical fiber;
    a thermal melting adhesive sleeve covering said wire member, said fitting sleeve and said guide sleeves; and
    a thermal shrinking tube covering said thermal melting adhesive sleeve.

2. A connection member according to claim 1, wherein said fitting sleeve further has an axial bore defined in a central portion thereof for receiving an adhesive.

3. A connection member for connecting optical fibers according to claim 1, wherein said thermal melting adhesive sleeve and said thermal shrinking tube are integral with each other.

4. A connection member for connecting optical fibers according to claim 1, wherein said wire member is formed of steel.

5. A method of connecting optical fibers comprising the steps of:
    preparing a wire member having a longitudinally extending groove defined therein, a fitting sleeve having a longitudinally extending inner bore and a pair of guide sleeves each having a longitudinal bore defined therein;
    inserting a pair of coated optical fibers into said guide sleeves so that respective end surfaces of bare optical fibers of said coated optical fibers abut each other at the center of said fitting sleeve;
    covering said coated optical fibers with a thermal melting adhesive sleeve and a thermal shrinking tube; and
    heating said thermal melting adhesive sleeve and said thermal shrinking tube from the outside thereof so that said thermal shrinking tube is shrinked while said adhesive sleeve is melted to thereby integrate said steel wire, said fitting sleeve, said guide sleeves and said optical fibers with each other.

6. A method of connecting optical fibers according to claim 5, further comprising the steps of:
    providing an axial bore in said fitting sleeve, and
    pouring an adhesive into said fitting sleeve through said axial bore so as to fix said end surfaces to each other.

* * * * *